United States Patent [19]

Rawlings

[11] Patent Number: 4,708,118

[45] Date of Patent: Nov. 24, 1987

[54] FUEL INJECTED INTERNAL COMBUSTION ENGINE POLLUTANT CONTROL SYSTEM

[75] Inventor: Kelly R. Rawlings, Big Bear Lake, Calif.

[73] Assignee: Anti-P, Inc., Los Angeles, Calif.

[21] Appl. No.: 881,724

[22] Filed: Jul. 3, 1986

Related U.S. Application Data

[63] Continuation-in-part of Ser. No. 853,425, Apr. 23, 1986, which is a continuation-in-part of Ser. No. 729,656, May 2, 1985, abandoned.

[51] Int. Cl.[4] .................. F02M 25/00; F02M 31/12
[52] U.S. Cl. ................... 123/555; 123/25 E;
123/25 L; 123/274; 123/549; 123/552;
123/573; 123/592; 239/133
[58] Field of Search ............... 123/555, 557, 552, 549,
123/525, 592, 275, 25 E, 25 L, 25 A, 25 Q, 541,
573, 274; 239/133

[56] References Cited

U.S. PATENT DOCUMENTS

| 904,203 | 11/1908 | Hertzberg et al. | 123/557 |
|---|---|---|---|
| 1,474,791 | 11/1923 | Rogers | 123/25 A |
| 2,073,887 | 3/1937 | Strancke | 123/25 L |
| 2,285,905 | 6/1942 | Cunningham et al. | 123/557 |
| 2,306,897 | 12/1942 | Ollig | 48/107 |
| 2,413,770 | 1/1947 | Knoy | 123/41.42 |
| 2,851,027 | 9/1958 | Kivela | 123/549 |
| 2,884,917 | 5/1959 | Quinby . | |
| 3,184,295 | 5/1965 | Baverstock | 48/184 |
| 3,477,238 | 11/1969 | Race | 123/541 |
| 3,850,152 | 11/1974 | Hollins . | |
| 3,868,939 | 3/1975 | Friese et al. | 123/557 |
| 3,931,800 | 1/1976 | Gendron . | |
| 3,931,801 | 1/1976 | Rose et al. . | |
| 3,933,135 | 1/1976 | Zillman et al. . | |
| 3,968,775 | 7/1976 | Harpman | 123/25 B |
| 4,020,815 | 5/1977 | Hubert | 123/142.5 R |
| 4,040,403 | 8/1977 | Rose et al. | 261/69 A |
| 4,046,122 | 9/1977 | Nakagawa et al. | 123/275 |
| 4,092,963 | 6/1978 | Vrooman | 261/142 |
| 4,180,036 | 12/1979 | Wolf . | |
| 4,213,433 | 7/1980 | Day | 123/549 |
| 4,216,751 | 8/1980 | Davison et al. | 123/523 |
| 4,274,383 | 6/1981 | Adams | 123/523 |
| 4,303,051 | 12/1981 | Weishaar | 123/557 |
| 4,345,141 | 8/1982 | Little | 219/207 |
| 4,345,570 | 8/1982 | McNeece | 123/557 |
| 4,356,805 | 11/1982 | Kler | 123/557 |
| 4,362,131 | 12/1982 | Mason et al. | 123/41.1 |
| 4,367,718 | 1/1983 | Heine | 123/557 |
| 4,391,259 | 7/1983 | Urban | 123/557 |
| 4,398,523 | 8/1983 | Henson | 123/557 |
| 4,411,240 | 10/1983 | Kravetz | 123/557 |
| 4,414,924 | 11/1983 | Harren | 123/25 E |
| 4,429,675 | 2/1984 | Talbert | 123/558 |
| 4,469,075 | 9/1984 | Jackson et al. | 123/523 |
| 4,589,376 | 5/1986 | Albertson | 123/25 E |

OTHER PUBLICATIONS

Mitchell 1984 edition, Electronic Fuel Injection Diagnosis and Testing Manual, published by Mitchell Manuals, Inc. of San Diego, Calif.
TECA Brochure for Standard Model 940-31, Manufactured by the ThermoElectric Cooling American Corp., 448 North Halsted Street, Chicago, Ill., 60622, (date unknown).

*Primary Examiner*—Andrew M. Dolinar
*Attorney, Agent, or Firm*—Kelly, Bauersfeld & Lowry

[57] ABSTRACT

An internal combustion engine having three valves per cylinder includes a novel fuel injector that produces a heated 30% liquid/70% vapor fuel mixture at the injector's outlet. This heated fuel mixture combines with air heated to a temperature within the range of 160° F. to 180° F. by thermistor controlled heating elements prior to entering a combustion chamber. To help reduce pollutants and increase efficiency of the engine, a methanol/water vapor mixture is further drawn through a PCV line and combined with the air/fuel mixture prior to entering into the combustion chamber.

19 Claims, 6 Drawing Figures

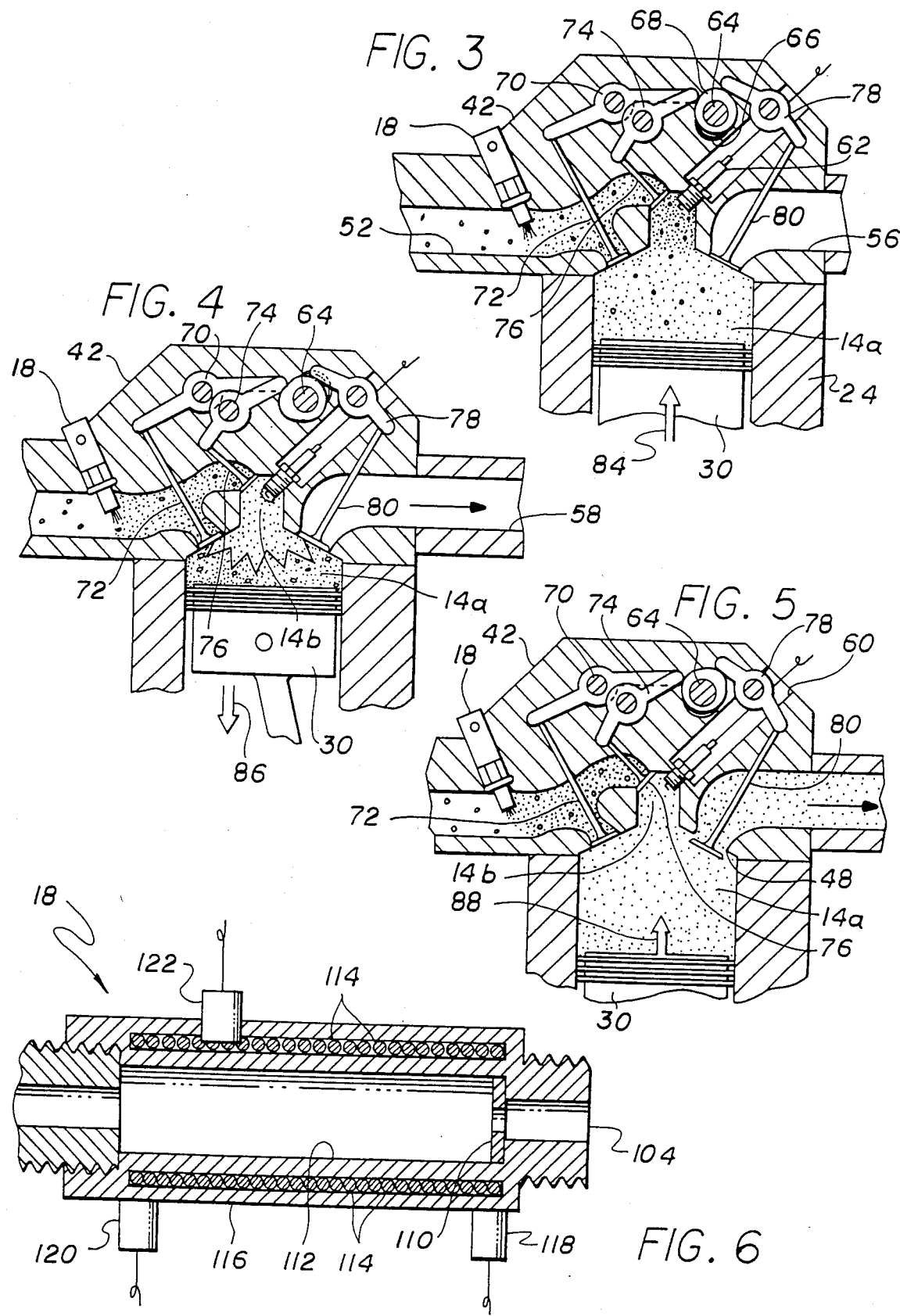

FUEL INJECTED INTERNAL COMBUSTION ENGINE POLLUTANT CONTROL SYSTEM

RELATED APPLICATIONS

This is a continuation-in-part of U.S. patent application Ser. No. 853,425, filed Apr. 23, 1986, which is a continuaton-in-part of U.S. patent application Ser. No. 729,656, filed May 2 1985, abandoned.

BACKGROUND OF THE INVENTION

This invention relates generally to internal combustion engines, and, more specifically, to an improved system for injecting heated and partially vaporized fuel into a conditioned airstream for forming a highly efficient explosive mixture to improve combustion and reduce pollutants.

The usual automotive vehicle using a gasoline powered internal combustion engine includes a fuel tank, a fuel pump and a carburetor. The carburetor is provided with a chamber for receiving gasoline from the fuel pump, and a float controlled valve maintains the gasoline at a constant level in the chamber. The usual carburetor includes a venturi through which air for combustion is drawn at substantial velocity, thus producing in the venturi a pressure substantially less than atmospheric. This reduced pressure induces a flow of fuel from the float chamber of carburetor, and as the gasoline in liquid phase emerges from jets or nozzles within the venturi, it is atomized or vaporized, or both, and mixed with the combiustion air flowing through the venturi.

The mixture of air and fuel is delivered to a manifold, and from the manifold is drawn into the engine's cylinders during the suction strokes of the pistons. The air/fuel mixture is compressed in each cylinder during the compression stroke of the piston, and is then ignited, either by a spark in the conventional engine, or by compression with or without supplementary heating means in a diesel engine. Ideally, combustion of the air/fuel mixture porgresses rapidly and is fully complete at the end of the power stroke of the piston. Too rapid burning or detonation is wasteful and causes knocking. Too slow burning results in some fuel failing to burn and being discharged in the exhaust. It is recognized that in the usual gasoline engine a very substantial percentage of fuel is wasted, and a relatively small percentage of the total energy available in the fuel is converted into usable energy by the engine.

Due to the inefficiencies of prior engines, many attempts have been made to improve the same by increasing the efficiency of the associated carburetion system. The ultimate purpose in increasing the efficiency of the carburetion system for an engine is to increase the percentage of fuel burnt in the cylinders, thereby increasing fuel economy and reducing certain undesirable combustion by-products such as hydrocarbons and carbon monoxide, and increasing other more desirable combustion by-products such as carbon dioxide.

It is generally accepted that reduction of harmful emissions could be accomplished by delivering a homogeneous mixture of air and fuel to the engine, thereby allowing lean mixtures to be burned with complete combustion. Many newer engines utilize fuel injectors rather than standard carburetor air/fuel mixing techniques to attempt to provide such homogeneous, lean air/fuel mixtures to the engine.

In a contnuous injection system, for example, air is drawn in the usual manner through the manifold and into the engine cylinders during the suction strokes of the pistons. Fuel injectors extend into the manifold or an air passageway immediately adjacent the cylinder intake port, for mixing fuel with the air immediately prior to entering the combustion chamber. In a mechanical system, the fuel injectors open at a pre-determined pressure, and after the engine is started, they remain open and continuously spray fuel. A vibrator pin inside the injector helps to break up and atomize the fuel droplets sprayed, and after the engine is stopped, the pin and a spring assembly seal off the injector to retain fuel pressure in the lines. This retention of pressure ensures quick starting.

Fuel metering is dependent on the volume of intake air into the engine. A mixture control unit measures incoming air flow and then distributes the correct amount of fuel to the cylinders to maintain a proper air/fuel ratio. In theory, constant maintenance of the air/fuel ratio results in improved performance, fuel economy and lowered exhaust emissions. In spite of the advance represented by fuel injection systems generally, it has been found that engine efficiency and fuel economy are still significantly less than ideal, and pollutant levels are correspondingly higher than that desired.

Accordingly, there is a need for an improved fuel injected internal combustion engine pollutant control system which allows leaner air/fuel mixtures to be efficiently burned within the engine cylinders without adversely affecting engine performance. Additionally, there is a need for a novel apparatus capable of safely and efficiently heating and partially vaporizing fuel into a specific mixture for injection into the intake airstream, and associated apparatus for heating the intake air prior to its combining with the heated injected fuel to form an explosive mixture. Moreover, there is a need for a system capable of conditioning the air prior to mixing with the fuel which, in addition to increasing engine efficiency, specifically lowers the temperature of combustion to decrease oxides of nitrogen as combustion by-products. Such systems and apparatus should be of simplified construction, maximize use of existing engine components, and be constructed of components known to be able to withstand the rigors of long-term automobile engine usage. The present invention fulfills these needs and provides other related advantages.

SUMMARY OF THE INVENTION

The present invention resides in an improved fuel injected internal combustion engine and a pollutant control system therefor, capable of increasing engine efficiency and reducing exhaust pollutants. To this end, the improved engine includes a novel fuel injector having means for producing a predetermined mixture of liquid and vaporized fuel at its outlet. In combination with this novel fuel injector, the pollutant control system provides means for heating the air intended to be combined with the liquid and partially vaporized fuel exiting the fuel injector. Moreover, means are provided for conditioning the airstream by injecting a methanol/water vapor mixture into the air intake manifold.

More specifically with respect to a preferred form of the invention, an air intake apparatus is provided having at least one resistance heating element situated therein which is capable of heating air to a temperature within the range of 160° F. to 180° F. An air temperature sensing means is situated downstream of the resistance heating element to control its temperature, and thus the temperature of the air.

Combustion chamber means are provided having a primary combustion chamber and a contiguous pre-combustion chamber where the sparkplug is situated. The combustion chamber means further includes an auxiliary intake port to the pre-combustion chamber, a primary intake port to the primary combustion chamber, and an exhaust port to the primary combustion chamber as well. Passage of an air/fuel mixture or exhaust through these ports is controlled by the selective positioning of a valve adjacent each port.

An air intake manifold directs air from the air intake apparatus to the combustion chamber means. A free-wheeling fan is situated within the air flow path defined by the air intake manifold and the air intake apparatus, to increase the turbulence of the air drawn into the combustion chamber means. This has the effect of enhancing the mixing of air and fuel prior to the mixture's entry into the combustion chambers, to improve the efficiency of combustion.

A fuel pump supplies liquid fuel to a novel fuel injector situated generally adjacent the combustion chamber means. The fuel injector directs fuel received from the fuel pump to the air intake manifold for mixing with air prior to be drawn into the combustion chamber means. The fuel injector includes means for heating and vaporizing fuel to produce a pre-determined mixture of approximately 30% liquid fuel and 70% vaporized fuel by volume for injection into the air intake manifold.

The fuel heating and vaporizing means includes a resistance heating element and a heat sink which defines a fuel heating reservoir situated generally adjacent an inlet of the fuel injector. This fuel heating and vaporizing means further includes fuel temperature sensor which, in connection with a thermister controlling electrical input to the resistance heating element, regulates the temperature of the heat sink. This heat sink is capable of maintaining the temperature of the heated liquid and partially vaporized fuel mixture existing the fuel heating reservoir within the range of 115° F. to 125° F. Moreover, a flow constricting valve is provided in the proximity of the fuel injector inlet to help vaporize and increase turbulence of the fuel as it passes through the fuel heating reservoir.

Finally, means are provided for injecting a methanol/water vapor mixture into the air intake manifold. This methanol/water vapor injecting means includes a storage container, a vapor passageway from the storage container to a PCV line, and means for cooling the methanol/water mixture within the storage container. This cooling means includes a cooling heat sink situated adjacent the storage container, and a blower for expediting transfer of heat from the heat sink to the atmosphere. Methanol/water vapor drawn into the PCV line is free to enter the air intake manifold for conditioning the air prior to its entry into the combustion chamber means.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 3 is a diagrammatic view similar to that illustrated in FIG. 1, showing the configuration of the piston and valves during a compression stroke;

FIG. 4 is a diagrammatic view similar to that illustrated in FIGS. 1 and 3, showing the configuration of the piston and valves as the air/fuel mixture is ignited within the combustion chamber and the piston is moved through the power stroke;

FIG. 5 is a diagrammatic view similar to that illustrated in FIGS. 1, 3 and 4, showing the configuration of the various engine components during an exhaust stroke; and FIG. 6 is an enlarged, fragmented sectional view taken along the lines 6—6 of FIG. 2, illustrating a novel fuel heating reservoir intergrally included within the improved fuel injector.

DETAILED DESCRIPTION OF THE PREFERRED EMBODIMENT

Figure 1:
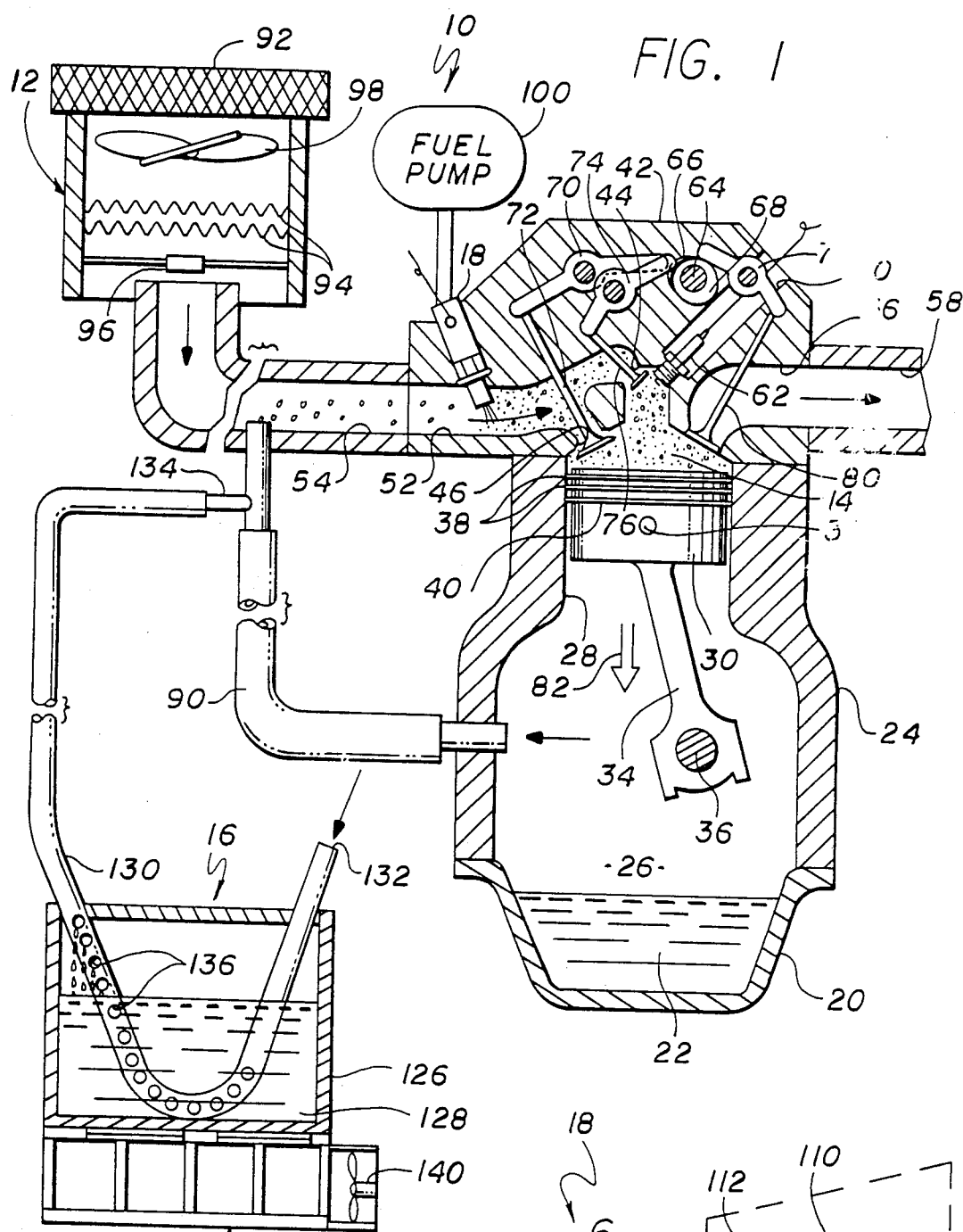
FIG. 1 is a diagrammatic illustration of the improved fuel injected internal combustion engine of the present invention, showing the positioning of the valves and piston at the beginning of a fuel intake stroke.

As shown in the drawings for purposes of illustration, the present invention is concerned with an improved fuel injected internal combustion engine pollutant control system, generally designated by the reference number 10. This improved pollutant control system 10 broadly comprises an air intake apparatus 12 designed to pre-heat the air before mixing with fuel and entering an engine combustion chamber 14. A methanol/water vapor delivery system 16 is provided to further condition the pre-heated air before it is mixed with fuel. Before entering the combustion chamber 14, pre-heated and partially vaporizd fuel is injected through a fuel injector 18 for mixing with the conditioned air.

The improved pollutant control system 10 of this invention permits leaner air/fuel mixtures to be efficiently burned within the combustion chamber 14 without adversely affecting engine performance. The improved pollutant control system 10 further provides apparatus for safely and efficiently heating fuel into a specific partially liquid/partially vaporized mixture which enhances complete combustion. The provision of the methanol/water vapor delivery system 16 conditions the air/fuel mixture drawn into the combustion chamber 14 in a manner which, in addition to increasing overall engine efficiency, specifically lowers the temperature of combustion to decrease oxides of nitrogen as combustion by-products. The system 10 of the present invention can easily be used in connection with other standard engine components well known to the automotive professional.

In this regard, the drawings diagrammatically illustrate typical portions of an internal combustion engine. More specifically, an oil pan 20 shown with oil 22 therein is connected to the bottom of a cylinder block 24 to define an engine crankcase 26. An upper portion of the cylinder block 24 forms a piston bore 28 wherein a piston head 30 is slidably positioned. This piston head 30 is connected by a wrist pin 32 to a piston rod 34, which in turn is connected to a crankshaft 36 running through the crankcase 26. The piston head 30 includes two upper compression rings 38 and a lower oil ring 40, all of which are designed to prevent communication between the primary combustion chamber 14a immediately above the piston head, and the crankcase 26 below.

A cylinder head 42 is attached to the block 24 in a manner aligning three ports 44, 46 and 48 over and in communication with the piston bore 28. The cylinder head 42 is configured to define an upper boundary of the primary combustion chamber 14a, and to additionally provide a contiguous pre-combustion chamber 14b. A cylinder head air inlet passageway 52 communicates with an air intake manifold 54 at one end, and with the combustion chamber 14 at the other. In particular, this head inlet passageway 52 communicates with the pre-combustion chamber 14b at the auxiliary intake port 44, and with the primary combustion chamber 14a at the primary intake port 46.

A cylinder head exhaust passageway 56 communicates with the primary combustion chamber 14a at the exhaust port 48 which is situated generally opposite the primary intake port 46. This head exhaust passageway 56 directs exhaust gases resulting from combustion into an exhaust manifold 58. A bore 60 is further provided through the cylinder head 42 for positioning a spark plug 62 so that its arc-producing end extends partially into the pre-combustion chamber 14b.

A camshaft 64, which rotates in connection with rotation of the crankshaft 36, supports a pair of cams 66 and 68. A primary intake valve rocker arm assembly 70 interacts with the intake cam 66 to control positioning of a primary intake valve assembly 72. This primary intake valve assembly 72 alternately opens and closes the primary intake port 46. Likewise, an auxiliary intake valve rocker arm assembly 74 interacts with the intake cam 66 to control positioning of an auxiliary intake valve assembly 76. This auxiliary intake valve assembly 76 alternately opens and closes the auxiliary intake port 44.

In a manner similar to that described above, an exhaust valve rocker arm assembly 78 interacts with the exhaust cam 68 to control positioning of an exhaust valve assembly 80. This exhaust valve assembly 80 alternately opens and closes the exhaust port 48.

It should be kept in mind that although a particular engine assembly is described herein, the present invention can be used with virtually any type of fuel injected engine. Thus, the foregoing description should not be interpreted as limiting the scope of the present invention.

With this in mind, a typical combustion cycle will now be described. Referring initially to FIG. 1, at the beginning of a fuel intake stroke of the piston head 30, the primary intake and auxiliary intake valve assemblies 72 and 76 will each open, respectively, the primary intake and auxiliary intake ports 46 and 44 to permit an air/fuel mixture to enter the combustion chamber 14. The particular engine shown is designed to accumulate a richer air/fuel mixture within the pre-combustion chamber 14b, and a much leaner air/fuel mixture within the primary combustion chamber 14a as the piston travels downwardly as indicated by the arrow 82. Approximately simultaneously with completion of the down stroke of the piston head 30, the intake valve assemblies 72 and 76 close the ports 46 and 44 to prevent escape of fuel from the combustion chamber 14 during the compression stroke indicated by the arrow 84 in FIG. 3. All of the ports 44 through 48 remain closed as the air/fuel mixture is ignited by the spark plug 62, thus driving the piston head 30 again downwardly as indicated by the arrow 86 in FIG. 4. Finally, the exhaust port 48 is opened during the next upward stroke of the piston head 34 as illustrated by the arrow 88 in FIG. 5, to expel combustion by-products from the combustion chamber 14 prior to repeating the entire combustion cycle.

Finally with respect to the standard engine components, a positive crankcase ventilation (PCV) line 90 is shown extending from the crankcase 26 through the cylinder block 24. This PCV line 90 provides a gas conduit from the crankcase 26 to the air intake manifold 54 for recirculating blow-by gases escaping the combustion chamber 14 past the piston rings 38 and 40.

In accordance with the present invention, an air filter 92 is positioned at the inlet of the air intake apparatus 12 to filter larger particulate matter from the air before it is drawn through the air intake manifold 54. A resistance heating element 94 is situated within the air intake apparatus 12, and a thermister 96 is situated downstream of the heating element to ensure that air drawn through the air intake apparatus into the air intake manifold 54 is heated to a temperature within the range 160° F. to 180° F. A free-wheeling fan 98 is situated within the air intake apparatus 12 below the air filter 92 but above the heating element 94, to increase the turbulence of the heated air drawn into the air intake manifold 54. The purpose of increasing the turbulence of the heated air is to improve mixing of the air and the fuel before that mixture is drawn into the combustion chamber 14.

The fuel injector 18 is positioned within the cylinder head 42 to inject fuel into the cylinder head air inlet passageway 52 to create, with the heated air, an explosive mixture to be drawn into the combustion chamber 14. Again it should be noted that the specific positioning of the fuel injector 18 as well as the specific construction thereof, may be varied in many ways without affecting the scope of the present invention. The particular fuel injector 18 illustrated in the accompanying drawings is similar to that utilized in Bosch continuous injection systems. Although the fuel injector 18 has been diagrammatically shown as receiving fuel from a fuel pump 100, it is not necessary that the particular configuration shown be utilized. Reference is made to the Mitchell 1984 edition, Electronic Fuel Injection Diagnosis and Testing Manual, published by Mitchell Manuals, Inc. of San Diego, Calif., for many different fuel injectors and associated systems compatible with the present invention.

Figure 2:
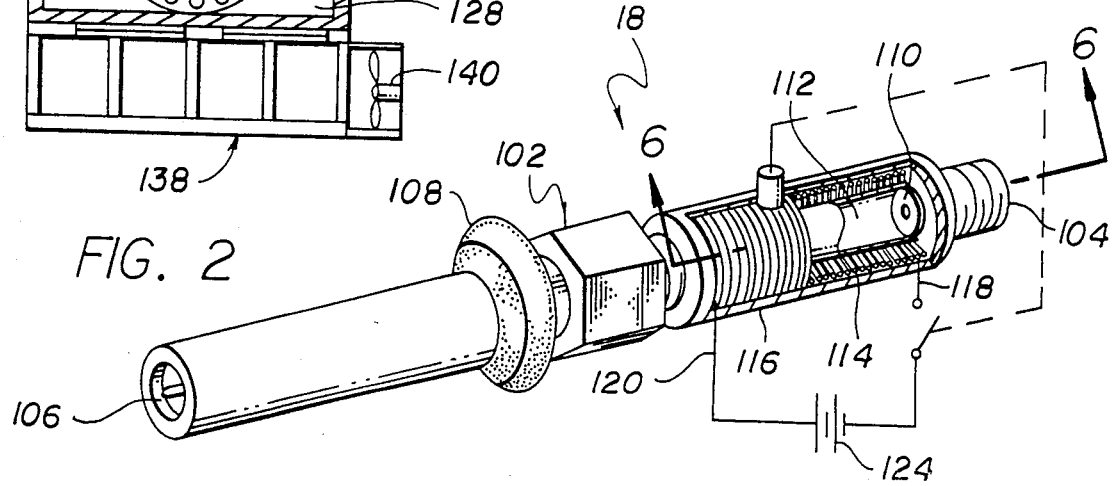
FIG. 2 is a perspective view of an exemplary improved fuel injector used in connection with the system illustrated in FIG. 1, showing the various components of a rear heating portion of the fuel injector in a progressively sectioned perspective.

As illustrated best in FIGS. 2 and 6, the fuel injector 18 comprises a body 102 having an inlet end 104 and an injecting end 106. When placed within the cylinder head 42, an O-ring 108 provides a seal for preventing leakage of fuel outwardly past the fuel injector 18. Fuel entering the inlet end 104 of the fuel injector 18 initially passes through an orifice provided by a flow constricting valve 110, and then passes into a fuel heating reservoir 112 dimensioned to slow the flow of fuel therethrough in comparison with fuel flowing through the remainder of the fuel injector. This fuel heating reservoir 112 is surrounded by an electrical heating coil 114, which is in turn encased by a rearward portion 116 of the fuel injector body 102. Electrical leads 118 and 120 pass through this rear portion 116 to provide electrical input to the heating coil 114 as needed to heat the fuel passing through the fuel heating reservoir 112 sufficiently so that as it exits the injecting end 106, its temperature is within the range of 115° F. to 125° F. To accomplish this, a temperature sensing means 122 is placed in contact with the heating coil 114 for transmitting a signal to a thermister which controls connection of the heating coil 114 with an electrical source 124.

In a continuous injection system, the fuel injector 18 opens at a pre-determined pressure and remains opened throughout the operating cycle of the engine. The purpose of the fuel heating reservoir 112 within the fuel injector 18 is to provide means for heating and vaporizing the fuel received from the fuel pump 100, for injection into the cylinder head inlet passageway 52. The novel fuel injector 18 described herein is preferably adjusted to inject a fuel mixture of approximately 30% liquid fuel and approximately 70% vaporized fuel by volume within the stated temperature range of 115° F. to 125° F. This fuel, when combined with the preheated air drawn through the air intake manifold 54, provides a highly volatile air/fuel mixture capable of being substantially completely burnt within the combustion chamber 14.

Referring again to FIG. 1, the preheated air drawn from the air intake apparatus 12 through the air intake manifold 54 is conditioned prior to mixing with the preheated fuel by the addition of a methanol/water vapor drawn through the PCV line 90 from the methanol/water vapor delivery system 16. This delivery system 16 includes a storage container 126 for holding a variable volume of a methanol/water solution 128. A hose 130 extends from an open end 132 downwardly into the container 126 and through the solution 128, and then upwardly again through the container to a tee coupling 134 which places the hose in open communication with the PCV line 90. A plurality of apertures 136 are provided through the hose 130 for permitting fluid entry into the hose. Heated air drawn through the air intake manifold 54 creates a vacuum on both the PVC line 90 and the hose 130. This vacuum causes air to be drawn through the open end 132 of the hose 130, and simultaneously causes some of the solution 128 to be siphoned upwardly through the hose toward the tee coupling 134. Since it is deemed generally undesirable for a liquid solution to be mixed with the heated air within the air intake manifold 54, the hose 130 is long enough to permit a methanol/water vapor to separate from the solution 128 being drawn through the hose 130, prior to reaching the tee coupling 134. The tee coupling 134 is further provided an injector nozzle having a variable orifice (not shown) which permits adjustment of the amount of methanol/water vapor permitted to pass through the PCV line 90 into the air intake manifold 54.

Although it is desirable to preheat the air and fuel prior to entry into the combustion chamber 14 for the purpose of obtaining better combustion, it has also been found that it is desirable to reduce the combustion temperature for the purpose of lowering oxides of nitrogen as a combustion by-product. To this end, means are provided for cooling the solution 128 within the storage container 126. Such cooling can be accomplished by the provision of a cooling heat sink 138 situated generally adjacent the storage container 126, and a blower 140 provided to facilitate transfer of heat from the heat sink to the atmosphere. It is presently preferred that the heat sink be provided in the form of a thermo-electric cooling module such as the TECA standard model 940-31, manufactured by the ThermoElectric Cooling American Corp., 448 North Halsted Street, Chicago, Ill. 60622.

From the foregoing it is to be appreciated that the novel fuel injector 18, together with the means for heating air drawn through the air intake manifold 54, permits a highly volatile air/fuel mixture to be drawn into the combustion chamber 14. When utilized in connection with an engine providing a pre-combustion chamber 14b, the auxiliary valve assembly 76 can be adjusted to provide an air/fuel ratio within the pre-combustion chamber 14b of approximately 12:1. Such an air/fuel ratio ensures initiation of a good flame front through the combustion chamber 14 on ignition by the spark plug 62. The primary intake valve assembly 72, on the other hand, can be adjusted so that the air/fuel ratio within the primary combustion chamber 14a is set at the leanest point possible without causing ignition misfires, or approximately at a 22:1 air/fuel ratio. This permits the engine to be operated at a high efficiency level while ensuring complete combustion of the air/fuel mixture within the combustion chamber 14. Besides reducing undesirable combustion by-products, the methanol/water vapor mixed with the heated air aids substantially in reducing carbon build-up within the combustion chamber 14.

Although a particular embodiment of this invention has been described in detail for purposes of illustration, various modifications may be made without departing from the spirit and scope of the invention. Accordingly, the invention is not to be limited, except as by the appended claims.

I claim:

1. A fuel injected internal combustion engine, comprising:
   an air intake apparatus having at least one resistance heating element capable of heating air passing therethrough to a temperature within a range of 160° F. to 180° F., and an air temperature sensing means situated downstream of the resistance heating element to control the temperature of the heating element;
   combustion chamber means including a primary combustion chamber and a contiguous pre-combustion chamber wherein a sparkplug is situated, the combustion chamber means further including a primary intake port to the primary combustion chamber and an auxiliary intake port to the pre-combustion chamber, as well as an exhaust port to the primary combustion chamber, wherein passage of air/fuel or exhaust through the ports is controlled by the selective positioning of a valve respectively positioned adjacent each port;
   air intake manifold means for directing air from the air intake apparatus to the combustion chamber means;
   a free-wheeling fan situated within the air intake apparatus to increase the turbulence of the air drawn through the air intake manifold means, whereby mixing of the air and fuel is enhanced to improve combustion within the combustion chamber means;
   a fuel pump;
   fuel injector means for directing fuel received from the fuel pump to the air intake manifold means for mixing with air prior to being drawn into the combustion chamber means, the fuel injector means including means for heating and vaporizing fuel passing therethrough to produce a pre-determined mixture of approximately 30% liquid fuel and 70% vaporized fuel by volume for injection into the air intake manifold means, the fuel heating and vaporizing means including a resistance heating element and a heat sink which defines a fuel heating reservoir situated generally adjacent an inlet of the fuel injector means, and fuel temperature sensing means which, in connection with a thermister controlling electrical input to the resistance heating element, regulates the temperature of the heat sink to maintain the temperature of the fuel exiting the fuel heating reservoir within the range of 115° F. to 125° F.;

a flow constricting valve in the proximity of the fuel injector means inlet, to help vaporize and increase turbulence of the fuel as it enters the fuel heating reservoir; and means for injecting a menthanol/water vapor mixture into the air intake manifold means, including a methanol/water storage container, a methanol/water vapor passageway from the storage container to a positive crankcase ventilation line, and means for cooling the methanol/water mixture within the storage container utilizing a cooling heat sink situated generally adjacent the storage container and a blower for expediting transfer of heat from the heat sink to the atmosphere.

2. A fuel injected internal combustion engine, comprising:

air intake means;

combustion chamber means having an air/fuel inlet and an exhaust outlet;

air intake manifold means for directing air from the air intake means to the combustion chamber means air/fuel inlet;

a fuel pump;

fuel injector means for directing fuel received from the fuel pump to the air intake manifold means for mixing with air prior to being drawn into the combustion chamber means, the fuel injector means including means for heating and vaporizing fuel passing therethrough to produce a pre-determined mixture of approximately 30% liquid fuel and 70% vaporized fuel by volume for injection into the air intake manifold means, the fuel heating and vaporizing means including a fuel heating reservoir adjacent an inlet of the fuel injector means, which fuel heating reservoir is sized to slow the flow of fuel therethrough in comparison with the fuel flowing through the remainder of the fuel injector means, an orifice at an inlet to the fuel heating reservoir, a resistance heating element which surrounds the heating reservoir, and means for sensing the temperature of the resistance heating element, wherein the temperature of the fuel heating reservoir is regulated to maintain the temperature of the fuel exiting the fuel heating reservoir within the range of 115° F. to 125° F.; and means for injecting a methanol/water vapor mixture into the air intake manifold means, the methanol/water vapor injecting means comprising a storage container, a methanol/water vapor passageway from the storage container through at least a portion of a PCV line to the air intake manifold means, and means for cooling the methanol/water mixture within the storage container, wherein the cooling means includes an electric cooling heat sink situated adjacent the storage container.

3. An engine as set forth in claim 2, including means for heating the air drawn through the air intake manifold means before entering the combustion chamber means.

4. An engine as set forth in claim 3, wherein the air heating means includes at least one resistance heating element situated within the air intake means and capable of heating the air passing thereby to a temperature within the range of 160° F. to 180° F., and an air temperature sensing means situated downstream of the resistance heating element to control the temperature of the heating element.

5. An engine as set forth in claim 3, including a freewheeling fan for increasing the turbulence of the air drawn through the air intake manifold means, whereby mixing of the air and fuel is enhanced to improve combustion within the combustion chamber means.

6. An engine as set forth in claim 2, wherein the combustion chamber means includes a pre-combustion chamber and a contiguous primary combustion chamber, the intake manifold means communicating with the primary combustion chamber at a primary intake port selectively closed by a primary intake valve, and the intake manifold means communicating with the pre-combustion chamber at an auxiliary intake port selectively closed by an auxiliary intake valve, whereby as the intake valves are opened, an air/fuel mixture is drawn into both combustion chambers in a manner ensuring good combustion therein yet minimizing the amount of fuel needed for combustion.

7. An engine as set forth in claim 2, wherein the cooling means further includes a blower to facilitate transfer of heat from the electric cooling heat sink to the atmosphere.

8. A pollutant control system for use with an internal combustion engine including, among other things, a fuel pump, an air intake means, and an intake manifold means for directing air to a combustion chamber means, the pollutant control system comprising, in combination:

means for heating air drawn through the air intake means before entering the combustion chamber means, to a temperature within the range of 160° F. to 180° F.;

a free-wheeling fan situated within the air flow path defined by the air intake means and the intake manifold means, to increase the turbulence of the air drawn through the intake manifold means;

means for injecting fuel received from the fuel pump into the intake manifold means for mixing with air to form an explosive mixture;

means for heating the fuel to be injected by the fuel injecting means, the heating means including a fuel heating reservoir postioned at an inlet of the injecting means, the fuel heating reservoir receving fuel from the fuel pump, a resistance heating element which surrounds the heating reservoir, and an orifice situated at an inlet of the fuel heating reservoir; and means for injecting a methanol/water vapor mixture into the intake manifold means, the methanol/water vapor injecting means comprising a storage container, a methanol/water vapor passageway from the storage container through at least a portion of a PCV line to the intake manifold means, an electric cooling heat sink situated adjacent the storage container, and a blower for facilitating transfer of heat from the cooling heat sink to the atmosphere.

9. A pollutant control system as set forth in claim 8, wherein the air heating means includes at least one resistance heating element, and an air temperature sensing means situated downstream of the resistance heating element to control the temperature of the heating element.

10. A pollutant control system as set forth in claim 8, wherein the fuel heating means causes the fuel exiting the injecting means to comprise a mixture of approximately 30% liquid fuel and approximately 70% vaporized fuel by volume within a temperature range of 115° F. to 125° F.

11. A pollutant control system for use with a fuel injected internal combustion engine including, among other things, a fuel pump, an intake manifold means for directing air to a combustion chamber means, and a fuel injector means for directing a fuel mixture from the fuel pump to the air intake manifold means, the pollutant control system comprising:
   an air intake means including at least one resistance heating element capable of heating air passing therethrough to a temperature within the range of 160° F. to 180° F., and an air temperature sensing means situated downstream of the resistance heating element to control the temperature of the heating element;
   means for heating and vaporizing fuel at the fuel injector means in a manner producing a pre-determined mixture of liquid and vaporized fuel at an outlet of the fuel injector means, the fuel heating and vaporizing means including a fuel heating reservoir situated adjacent an inlet of the fuel injector means and being dimensioned to slow the flow of fuel therethrough in comparison with fuel flowing through the fuel injector means, the fuel heating reservoir having an orifice at the inlet thereof through which fluid passes from the fuel pump to the fuel injector means, a resistance heating element which surrounds the heating reservoir, and means for sensing the temperature of the resistance heating element; and
   means for injecting a methanol/water vapor mixture into the intake manifold means, the vapor mixture injecting means including a storage container, a methanol/water vapor passageway from the storage container and through at least a portion of a PCV line to the intake manifold means, and means for cooling the methanol/water mixture within the storage container.

12. A pollutant control system as set forth in claim 11, including a free-wheeling fan situated within the air intake means to increase the turbulence of the air drawn through the intake manifold means, whereby mixing of the air and fuel is enhanced to improve combustion within the combustion chamber means.

13. A pollutant control system as set forth in claim 12, wherein the combustion chamber means includes a primary combustion chamber and a contiguous pre-combustion chamber wherein a spark plug is situated, the combustion chamber means further including a primary intake port to the primary combustion chamber and an auxiliary intake port to the pre-combustion chamber, as well as an exhaust port to the primary combustion chamber, wherein passage of air/fuel or exhaust through the ports is controlled by the selective positioning of a valve respectively positioned adjacent each port.

14. A pollutant control system as set forth in claim 11, wherein the pre-determined mixture of liquid and vaporized fuel at the outlet of the fuel injector means comprises approximately 30% liquid fuel and approximately 70% vaporized fuel by volume, and the temperature of the pre-determined mixture is within the range of 115° F. to 125° F.

15. A pollutant control system for use with a fuel injected internal combustion engine including, among other things, a fuel pump, an air intake means, an intake manifold means for directing air to a combustion chamber means, and a fuel injector means for directing a fuel mixture from the fuel pump to the air intake manifold means, the pollutant control system comprising:
   means for heating and vaporizing fuel at the fuel injector means in a manner producing a pre-determined mixture of liquid and vaporized fuel at an outlet of the fuel injector means, the fuel heating and vaporizing means including a fuel heating reservoir situated adjacent an inlet of the fuel injector means and being dimensioned to slow the flow of fuel therethrough in comparison with fuel flowing through the fuel injector means, the fuel heating reservoir having an orifice at the inlet thereof through which fluid passes from the fuel pump to the fuel injector means, a resistance heating element which surrounds the heating reservoir, and means for sensing the temperature of the resistance heating element; and
   means for injecting a methanol/water vapor mixture into the intake manifold means, the vapor mixture injecting means including a storage container, a methanol/water vapor passageway from the storage container and through at least a portion of a PCV line to the intake manifold means, and means for cooling the methanol/water mixture within the storage container, wherein the cooling means includes an electric cooling heat sink situated adjacent the storage container, and a blower to facilitate transfer of heat form the cooling heat sink to the atmosphere.

16. A pollutant control system as set forth in claim 15, wherein the air intake means includes at least one resistance heating element capable of heating air passing therethrough to a temperature within the range of 160° F. to 180° F., and an air temperature sensing means situated downstream of the resistance heating element to control the temperature of the heating element.

17. A pollutant control system as set forth in claim 16, including a free-wheeling fan situated within the air intake means to increase the turbulence of the air drawn through the intake manifold means, whereby mixing of the air and fuel is enhanced to improve combustion within the combustion chamber means.

18. A pollutant control system as set forth in claim 15, wherein the combustion chamber means includes a primary combustion chamber and a contiguous pre-combustion chamber wherein a spark plug is situated, the combustion chamber means further including a primary intake port to the primary combustion chamber and an auxiliary intake port to the pre-combustion chamber, as well as an exhaust port to the primary combustion chamber, wherein passage of air/fuel or exhaust through the ports is controlled by the selective positioning of a valve respectively positioned adjacent each port.

19. A pollutant control system as set forth in claim 15, wherein the pre-determined mixture of liquid and vaporized fuel at the outlet of the fuel injector means comprises approximately 30% liquid fuel and approximately 70% vaporized fuel by volume, and the temperature of the pre-determined mixture is within the range of 115° F. to 125° F.

* * * * *